United States Patent
Chalmers

(10) Patent No.: US 10,724,900 B2
(45) Date of Patent: Jul. 28, 2020

(54) DETERMINING FOCUS CONDITION IN SPECTRAL REFLECTANCE SYSTEM

(71) Applicant: FILMETRICS, INC., San Diego, CA (US)

(72) Inventor: Scott A. Chalmers, San Diego, CA (US)

(73) Assignee: Filmetrics, Inc., San Diego, CA (US)

(*) Notice: Subject to any disclaimer, the term of this patent is extended or adjusted under 35 U.S.C. 154(b) by 136 days.

(21) Appl. No.: 15/273,876

(22) Filed: Sep. 23, 2016

(65) Prior Publication Data
US 2017/0108377 A1 Apr. 20, 2017

Related U.S. Application Data

(60) Provisional application No. 62/222,569, filed on Sep. 23, 2015.

(51) Int. Cl.
*G01J 3/02* (2006.01)
*G02B 7/182* (2006.01)

(52) U.S. Cl.
CPC ........... *G01J 3/0237* (2013.01); *G01J 3/021* (2013.01); *G01J 3/024* (2013.01); *G01J 3/0218* (2013.01); *G02B 7/182* (2013.01)

(58) Field of Classification Search
CPC .................. G01B 9/04; G01J 3/0237
See application file for complete search history.

(56) References Cited

U.S. PATENT DOCUMENTS

| 4,707,610 | A * | 11/1987 | Lindow | G01B 11/02 250/559.08 |
| 5,365,340 | A * | 11/1994 | Ledger | G01B 11/0625 356/504 |
| 5,822,061 | A * | 10/1998 | Delhaye | G01J 3/42 356/326 |
| 9,719,777 | B1 * | 8/2017 | Colonna de Lega | G01B 9/02083 |
| 2003/0164440 | A1 * | 9/2003 | Czarnetzki | G02B 7/28 250/201.3 |
| 2014/0150953 | A1 * | 6/2014 | Sieben | B29C 65/1638 156/64 |
| 2016/0091366 | A1 * | 3/2016 | Yang | G01J 3/0237 356/301 |

* cited by examiner

*Primary Examiner* — Thanh Luu
(74) *Attorney, Agent, or Firm* — Hodgson Russ LLP

(57) ABSTRACT

Embodiments include a spectral reflectance system comprising a light source. The system includes a platform configured to retain a sample. The system includes an optical director positioned in the optical path between the light source and the platform. The optical director couples light from the light source to the platform. The system includes a detector positioned to receive reflected light from the sample. The detector generates a signal representing the reflected light. The system includes a focusing system coupled to the optical director. In response to the signal the focusing system automatically focuses the light on the sample by controlling a position of the optical director to maximize a strength of the signal.

36 Claims, 2 Drawing Sheets

DETERMINING FOCUS CONDITION IN SPECTRAL REFLECTANCE SYSTEM

RELATED APPLICATION

This application claims the benefit of U.S. Patent Application No. 62/222,569, filed Sep. 23, 2015.

TECHNICAL FIELD

This invention relates generally to the field of electro-optical systems and, more particularly, to spectral reflectance systems and methods.

BACKGROUND

Surface characterization is critical for product performance in a wide range of applications across various industries. Thus, there is a need for more accurate control of instrumentation used to determine material properties through spectral reflectance and/or optical microscopy.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

DETAILED DESCRIPTION

Embodiments include a spectral reflectance system comprising a light source. The system includes a platform configured to retain a sample. The system includes an optical director positioned in the optical path between the light source and the platform. The optical director couples light from the light source to the platform. The system includes a detector positioned to receive reflected light from the sample. The detector generates a signal representing the reflected light. The system includes a focusing system coupled to the optical director. In response to the signal the focusing system automatically focuses the light on the sample by controlling a position of the optical director to maximize a strength of the signal at the detector.

In the following description, numerous specific details are introduced to provide a thorough understanding of, and enabling description for, embodiments of the reflectance systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
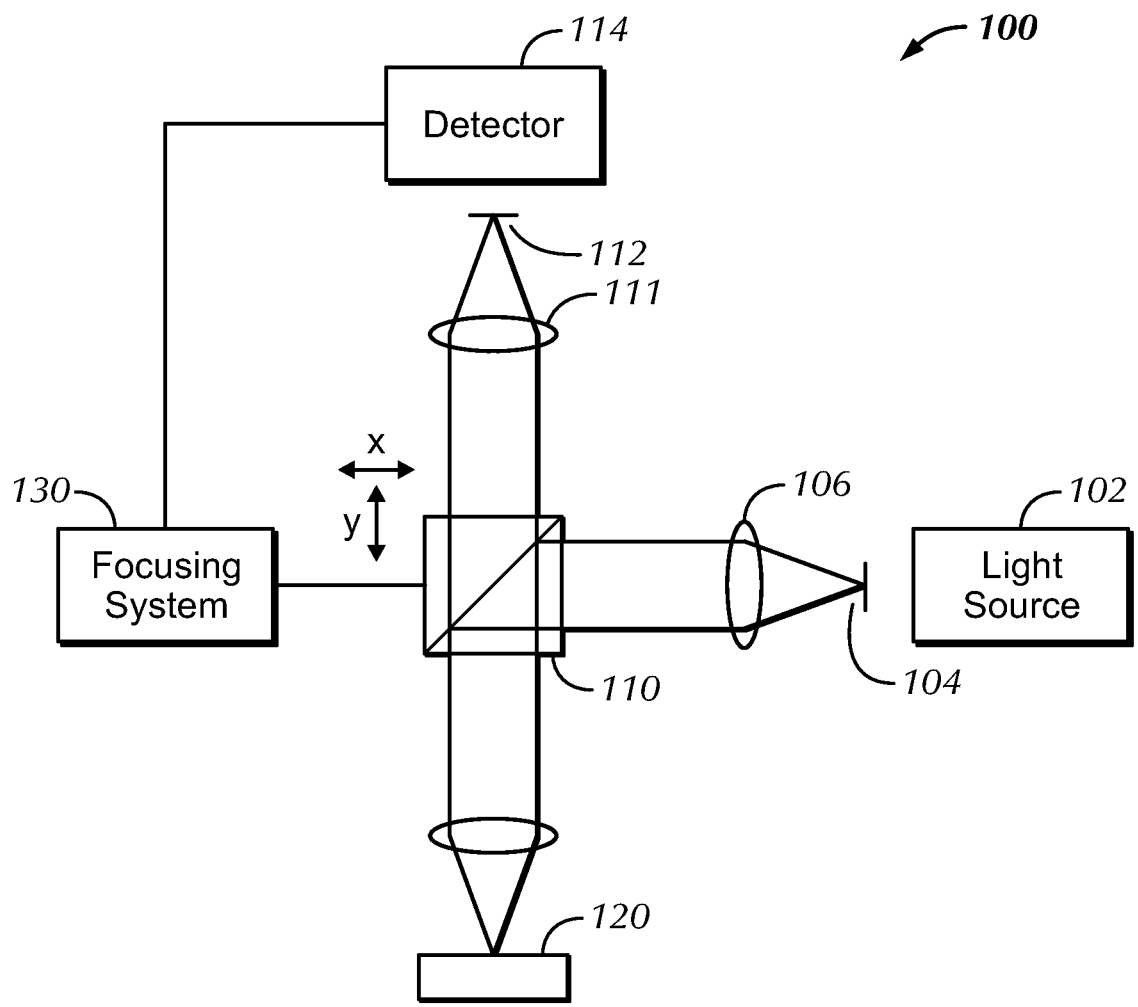
FIG. 1 is a reflectance system, under an embodiment.

FIG. 1 is a reflectance system 100, under an embodiment. The reflectance system 100 includes a light or illumination source. The light source of an embodiment includes a radiation source 102, a source aperture 104 (finite aperture), and a lens 106 (e.g., collimating lens). The radiation source 102 includes, for example, one or more of a white light, Xenon lamp, Halogen lamp, and laser, but is not so limited. A light beam generated by this optical configuration is directed at an optical device or director 110 that is configured to redirect the light to illuminate points or regions of the surface of a sample 120 (when present). The sample, when present, is retained or secured on a platform or stage. The optical director 110 of an embodiment includes a beam splitter. Alternatively, the optical director 110 comprises one or more mirrors, for example, the optical director 110 can include a first mirror configured to couple the optical path between the light source and the optical director and a second mirror configured to couple the optical path between the optical director and the sample. As yet another alternative, the reflector 110 includes an off-axis reflector (not shown). The optical director 110 however, is not limited to a particular device and can include other types of optical components configured to split incident light at a designated ratio into two separate beams.

The light reflected from the surface of the sample 120 returns and forms an aperture image at the optical director 110, which redirects the aperture image to a detector 114 via a lens 111 (e.g., focusing lens, etc.) and a detector aperture 112 (finite aperture). The detector 114 includes, for example, one or more of a spectrometer, a sensor, a charge coupled device (CCD) camera, and a complementary metal-oxide semiconductor (CMOS) camera, to name a few. The detector may be configured to convert the received image to a map of measured reflectance data by a processor (not shown) of or coupled to the detector. This map or other data of measured reflectance data may then be compared to reference reflectance data to generate, for example, a map of the outer layer thickness profile of the sample 120, but embodiment are not so limited.

The source aperture 104 is imaged directly on the detector aperture 112 when the sample is in focus (minimal underfill and/or overfill), and this condition produces a maximum signal strength at the detector. Consequently, the focus condition of the sample can be determined using the signal strength of the signal received at the detector 114. The system of an embodiment is configured to automatically control/adjust the focus of the sample 120 by controlling a position of a component of the system using information of the received signal strength at the detector 114 in order to achieve maximum signal strength at the detector 114, and hence best focus.

The system of an embodiment automatically controls focus of the sample at the detector 114 with a focusing system 130 coupled to the optical director 110. The focusing system controls the position of the optical director 110 to image the light source aperture 104 directly on the detector aperture 112 to maximize the strength of the detected signal. The focusing system 130, which receives information of the signal received at the detector 114, is configured to control focus of the sample 120 at the detector in response to the detector signal by using information or data of the detector signal to control a position (movement) of the optical director 110 and/or one or more components of the optical director 110. The position of the optical director 110 and/or components is controlled relative to at least one of the light source 102, the detector 114 and the sample 120, for example, but is not so limited. The focusing system 130 can include, for example, a motorized component (e.g., stage, mount, gimbal, etc.) (not shown) configured to control positioning of the optical director 110 and/or components of the optical director 110 along at least two axes X and Y relative to at least one of the light source 102, the detector 114 and the sample 120.

Figure 2:
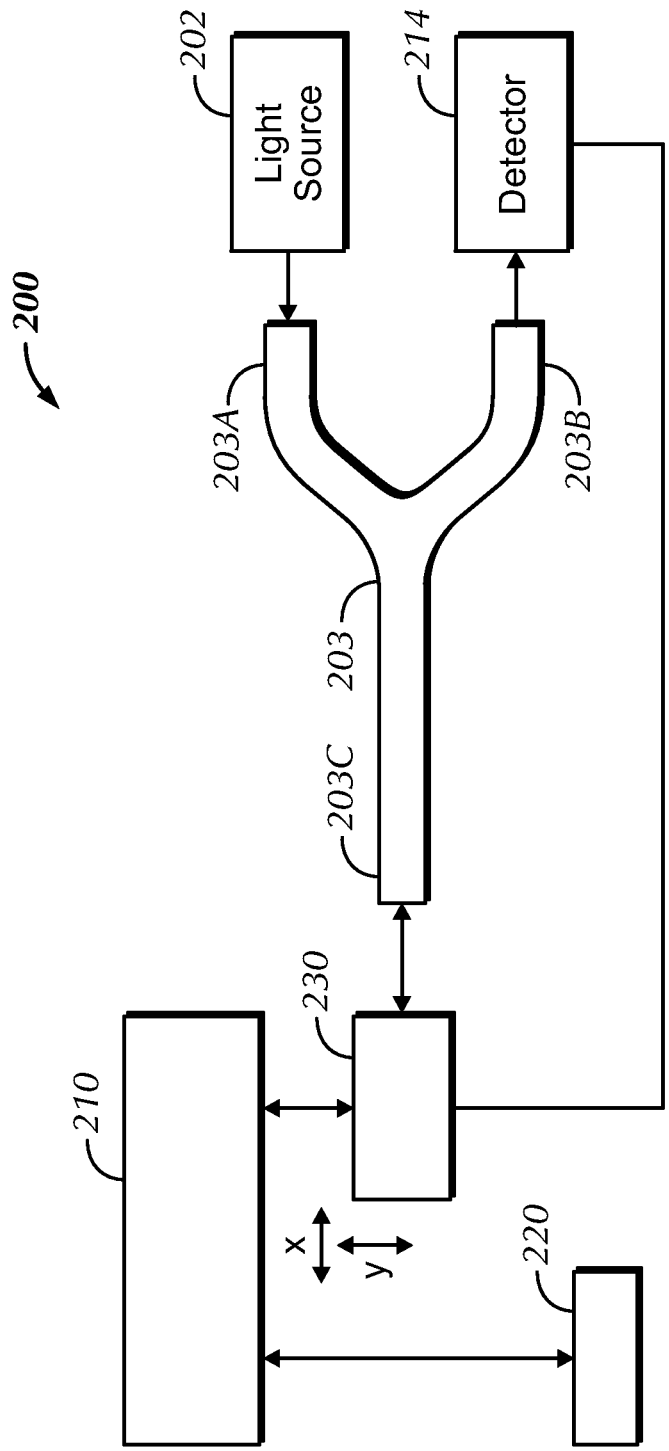
FIG. 2 is a reflectance system, under an alternative embodiment.

FIG. 2 is a reflectance system 200, under an alternative embodiment. The reflectance system 200 is configured so that light illuminating the sample and light reflected from the sample take a similar path through the system. The system 200 includes an illumination light source 202 and a fiber-optic coupler 203. The coupler 203, an example of which is available from OZ Optics (www.ozoptics.com), allows both outgoing illumination light and returning reflected light to travel in the same common end 203C of the coupler 203. The illumination light is coupled to or passes into an input or first branch 203A of the coupler 203 from the light source 202, and is output through a common branch 203C of the coupler 203 where it is directed at a focusing system 230. The focusing system 230 of an embodiment is positioned adjacent to the platform; alternatively, the focusing system 230 is positioned in a same plane as the platform.

The focusing system or device 230, which includes at least one of a lens and a focusing mirror (not shown), is configured to couple the light to an optical device or director 210 that is configured to redirect the light to illuminate points or regions of the surface of a sample 220. The optical director 210 includes optical component(s) configured to direct incident light from the light source 202 to the sample 220, and to direct reflected light from the sample 220 to the detector 214. For example, the optical director of an embodiment comprises retroreflector mirrors, but is not so limited. Light reflected from the surface of the sample 220 returns and forms an image at the optical director 210. The optical director 210 redirects the image to the focusing system 230, which concentrates it onto the end of the common branch 203C of the coupler 203. The coupler 203 directs or couples the light to an output or third branch 203B of the fiber-optic coupler 203, which is configured to couple or transmit the light to the detector 214 (e.g., spectrometer, sensor, charge coupled device (CCD) camera, complementary metal-oxide semiconductor (CMOS) camera, etc.).

The source aperture (fiber end) of the first branch 203A of the coupler 203 is imaged directly on the detector aperture (fiber end) of the third branch 203B of the coupler 203 when the sample is in focus (minimal underfill and/or overfill), and this condition produces a maximum signal strength at the detector. Consequently, the focus condition of the sample can be determined using the signal strength of the signal received at the detector 214. The system of an embodiment is configured to automatically control/adjust the focus of the sample 220 by controlling a position of a component of the system using information of the received signal strength at the detector 214 in order to achieve maximum signal strength at the detector 214, and hence best focus.

The system of an embodiment automatically controls focus of the sample at the detector 214 with a focusing system 230 positioned or coupled in the optical path between the common branch 203C of the coupler 203 and the optical director 210. The focusing system 230, which receives information of the signal received at the detector 214, is configured to control focus of the sample at the detector 214 in response to the detector signal by using information or data of the detector signal to control a position of one or more components of the focusing system 230. The position of the focusing system component is controlled relative to at least one of the coupler 203 and the optical director 210, but is not so limited. The focusing system 230 of an embodiment includes at least one positioning component (e.g., motor, stage, mount, gimbal, etc.) configured to control positioning of a light-directing component (e.g., mirror, etc.) along at least two axes X and Y relative to at least one of the coupler 203 and the optical director 210. The focusing system 230 is therefore configured to control the focus of coupled light, but the embodiment is not so limited.

Alternatively, the system of an embodiment is configured to automatically control focus of the sample at the detector 214 with a focusing system 230 coupled to the optical director 210. The focusing system 230, which receives information of the signal received at the detector 214, is configured to control focus of the sample 220 at the detector in response to the detector signal by using information or data of the detector signal to control a position of one or more components of the optical director 210 and/or one or more components of the focusing system 230, as described in detail herein.

Embodiments described herein include a spectral reflectance system, comprising a light source. The system includes a platform configured to retain a sample. The system includes an optical director positioned in the optical path between the light source and the platform. The optical director couples light from the light source to the platform. The system includes a detector positioned to receive reflected light from the sample. The detector generates a signal representing the reflected light. The system includes a focusing system coupled to the optical director. In response to the signal the focusing system automatically focuses the light on the sample by controlling a position of the optical director to maximize a strength of the signal.

Embodiments described herein include a spectral reflectance system, comprising: a light source; a platform configured to retain a sample; an optical director positioned in the optical path between the light source and the platform, wherein the optical director couples light from the light source to the platform; a detector positioned to receive reflected light from the sample, wherein the detector generates a signal representing the reflected light; and a focusing system coupled to the optical director, wherein in response to the signal the focusing system automatically focuses the light on the sample by controlling a position of the optical director to maximize a strength of the signal.

The optical director comprises a plurality of mirrors.

A first mirror of the plurality of mirrors couples the optical path between the light source and the optical director.

A second mirror of the plurality of mirrors couples the optical path between the optical director and the sample.

The focusing system controls a length of the optical path by controlling movement of the optical director relative to the platform.

The system comprises a focusing device in the optical path between the light source and the optical director.

The light source comprises a light source aperture.

The detector comprises a detector aperture.

The focusing system controls the position of the optical director to image the light source aperture directly on the detector aperture, wherein the strength of the signal is maximized.

The system comprises a fiber coupler, wherein a first port of the fiber coupler is coupled to the light source, a second port of the fiber coupler is coupled to the detector, and a third port of the fiber coupler is coupled to the optical director in the optical path.

The system comprises a focusing device in the optical path between the third port and the optical director.

The focusing device is positioned adjacent to the platform.

The focusing device is positioned in a same plane as the platform.

The focusing device comprises a lens.

The focusing device comprises a focusing mirror.

The optical director comprises retroreflector mirrors.

The optical director comprises a first mirror that couples the optical path to the third port of the fiber coupler.

The optical director comprises a second mirror that couples the optical path to the sample.

The optical director comprises a beamsplitter.

The beamsplitter is configured to direct a light signal from the light source to the sample.

The beamsplitter is configured to direct reflected light of the light signal from the sample to the detector.

The focusing system controls a length of the optical path by controlling movement of the beamsplitter relative to the platform.

The system comprises a first lens positioned between the light source and the beamsplitter, wherein the first lens is a collimating lens.

The system comprises a second lens positioned between the beamsplitter and the detector, wherein the second lens is a focusing lens.

The detector comprises a spectrometer.

Embodiments described herein include a spectral reflectance system, comprising a light source coupled to a first port of a fiber coupler. The system includes a platform configured to retain a sample. The system includes an optical director positioned in the optical path between the light source and the platform. The optical director couples light received from the light source via a second port of the fiber coupler to the platform. The system includes a detector coupled to receive reflected light from the sample via a third port of the fiber coupler. The detector generates a signal representing the reflected light. The system includes a focusing system coupled to the optical director. In response to the signal the focusing system automatically focuses the light on the sample by controlling a position of the optical director to maximize a strength of the signal.

Embodiments described herein include a spectral reflectance system, comprising: a light source coupled to a first port of a fiber coupler; a platform configured to retain a sample; an optical director positioned in the optical path between the light source and the platform, wherein the optical director couples light received from the light source via a second port of the fiber coupler to the platform; a detector coupled to receive reflected light from the sample via a third port of the fiber coupler, wherein the detector generates a signal representing the reflected light; and a focusing system coupled to the optical director, wherein in response to the signal the focusing system automatically focuses the light on the sample by controlling a position of the optical director to maximize a strength of the signal.

Embodiments described herein include a method comprising directing light along an optical path from a light source to a platform configured to retain a sample. The optical path includes a first port and a second port of a fiber coupler and an optical director. The method includes positioning a detector to receive reflected light from the sample via the second port and a third port of the fiber coupler. The method includes generating a signal representing the reflected light received at the detector. The method includes, in response to the signal, automatically focusing the light on the sample by controlling a position of the optical director to maximize a strength of the signal.

Embodiments described herein include a method comprising: directing light along an optical path from a light source to a platform configured to retain a sample, wherein the optical path includes a first port and a second port of a fiber coupler and an optical director; positioning a detector to receive reflected light from the sample via the second port and a third port of the fiber coupler; generating a signal representing the reflected light received at the detector; and in response to the signal, automatically focusing the light on the sample by controlling a position of the optical director to maximize a strength of the signal.

Embodiments described herein include a method comprising directing light along an optical path from a light source to a platform configured to retain a sample. The optical path includes an optical director. The method includes positioning a detector to receive reflected light from the sample. The method includes generating a signal representing the reflected light received at the detector. The method includes, in response to the signal, automatically focusing the light on the sample by controlling a position of the optical director to maximize a strength of the signal.

Embodiments described herein include a method comprising: directing light along an optical path from a light source to a platform configured to retain a sample, wherein the optical path includes an optical director; positioning a detector to receive reflected light from the sample; generating a signal representing the reflected light received at the detector; and in response to the signal, automatically focusing the light on the sample by controlling a position of the optical director to maximize a strength of the signal.

The optical director is configured to include a plurality of mirrors.

The method comprises coupling the optical path between the light source and the optical director using a first mirror of the plurality of mirrors.

The method comprises coupling the optical path between the optical director and the sample using a second mirror of the plurality of mirrors.

Automatically focusing the light comprises controlling a length of the optical path by controlling movement of the optical director relative to the platform.

The method comprises focusing light of the light source on the optical director.

The light source comprises a light source aperture.

The detector comprises a detector aperture.

Automatically focusing the light comprises controlling the position of the optical director to image the light source aperture directly on the detector aperture, wherein the strength of the signal is maximized.

The method comprises coupling a first port of a fiber coupler to the light source, coupling a second port of the fiber coupler to the detector, and coupling a third port of the fiber coupler to the optical director in the optical path.

The method comprises focusing light of the light source on the optical director using a focusing device in the optical path between the third port and the optical director.

The method comprises positioning the focusing device adjacent to the platform.

The method comprises positioning the focusing device in a same plane as the platform.

The focusing device comprises a lens.

The focusing device comprises a focusing mirror.

The optical director comprises retroreflector mirrors.

The method comprises coupling the optical path to the third port of the fiber coupler using a first mirror of the optical director.

The method comprises coupling the optical path to the sample using a second mirror of the optical director.

The optical director comprises a beamsplitter.

The method comprises positioning the beamsplitter to direct a light signal from the light source to the sample.

The method comprises positioning the beamsplitter to direct reflected light of the light signal from the sample to the detector.

The method comprises using the focusing system to control a length of the optical path by controlling movement of the beamsplitter relative to the platform.

The method comprises positioning a first lens between the light source and the beamsplitter, wherein the first lens is a collimating lens.

The method comprises positioning a second lens between the beamsplitter and the detector, wherein the second lens is a focusing lens.

The detector comprises a spectrometer.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the light source systems and methods is not intended to be exhaustive or to limit the systems and methods described to the precise form disclosed. While specific embodiments of, and examples for, the light source systems and methods are described herein for illustrative purposes, various equivalent modifications are possible within the scope of other light source systems and methods, as those skilled in the relevant art will recognize. The teachings of the light source systems and methods provided herein can be applied to other processing and measurement systems and methods, not only for the systems and methods described above.

The elements and acts of the various embodiments described above can be combined to provide further embodiments. These and other changes can be made to the light source systems and methods in light of the above detailed description.

In general, in the following claims, the terms used should not be construed to limit the light source systems and methods to the specific embodiments disclosed in the specification and the claims, but should be construed to include all systems and methods that operate under the claims. Accordingly, the light source systems and methods are not limited by the disclosure, but instead the scope of the light source systems and methods is to be determined entirely by the claims.

While certain aspects of the light source systems and methods are presented below in certain claim forms, the inventors contemplate the various aspects of the light source systems and methods in any number of claim forms. Accordingly, the inventors reserve the right to add additional claims after filing the application to pursue such additional claim forms for other aspects of the light source systems and methods.

What is claimed is:

1. A spectral reflectance system, comprising:
   a light source;
   a platform configured to retain a sample;
   an optical director positioned in the optical path between the light source and the platform, wherein the optical director couples light from the light source to the platform, and wherein the optical director comprises a beamsplitter;
   a lens disposed between the optical director and the platform;
   a detector positioned to receive reflected light from the sample, wherein the detector generates a signal representing the reflected light;
   a focusing system coupled to the optical director, wherein in response to the signal the focusing system automatically focuses the light on the sample by controlling a position of the optical director to maximize a strength of the signal; and
   a processor in electronic communication with the detector, wherein the processor determines a map of measured reflectance data from the signal and compares the map of measured reflectance data to reference reflectance data to generate a map of outer layer thickness profile of the sample.

2. The spectral reflectance system of claim 1, comprising a focusing device in the optical path between the light source and the optical director.

3. The spectral reflectance system of claim 1, wherein the light source comprises a light source aperture.

4. The spectral reflectance system of claim 3, wherein the detector comprises a detector aperture.

5. The spectral reflectance system of claim 4, wherein the focusing system controls the position of the optical director to image the light source aperture directly on the detector aperture, wherein the strength of the signal is maximized.

6. The spectral reflectance system of claim 1, comprising a fiber coupler, wherein a first port of the fiber coupler is coupled to the light source, a second port of the fiber coupler is coupled to the detector, and a third port of the fiber coupler is coupled to the optical director in the optical path.

7. The spectral reflectance system of claim 6, comprising a focusing device in the optical path between the third port and the optical director.

8. The spectral reflectance system of claim 7, wherein the focusing device is positioned adjacent to the platform.

9. The spectral reflectance system of claim 8, wherein the focusing device is positioned in a same plane as the platform.

10. The spectral reflectance system of claim 7, wherein the focusing device comprises a lens.

11. The spectral reflectance system of claim 7, wherein the focusing device comprises a focusing mirror.

12. The spectral reflectance system of claim 1, wherein the beamsplitter is configured to direct a light signal from the light source to the sample.

13. The spectral reflectance system of claim 12, wherein the beamsplitter is configured to direct reflected light of the light signal from the sample to the detector.

14. The spectral reflectance system of claim 1, wherein the focusing system controls a length of the optical path by controlling movement of the beamsplitter relative to the platform.

15. The spectral reflectance system of claim 1, comprising a first lens positioned between the light source and the beamsplitter, wherein the first lens is a collimating lens.

16. The spectral reflectance system of claim 15, comprising a second lens positioned between the beamsplitter and the detector, wherein the second lens is a focusing lens.

17. The spectral reflectance system of claim 1, wherein the detector comprises a spectrometer.

18. A method comprising:
  directing light along an optical path from a light source to a platform configured to retain a sample, wherein the optical path includes an optical director and a lens between the optical director and the platform, and wherein the optical director comprises a beamsplitter;
  positioning a detector to receive reflected light from the sample;
  generating a signal representing the reflected light received at the detector;
  determining a map of measured reflectance data from the signal using a processor;
  comparing the map of measured reflectance data to reference reflectance data to generate a map of outer layer thickness profile of the sample using the processor; and
  in response to the signal, automatically focusing the light on the sample by controlling a position of the optical director to maximize a strength of the signal.

19. The method of claim 18, comprising focusing light of the light source on the optical director.

20. The method of claim 18, wherein the light source comprises a light source aperture.

21. The method of claim 20, wherein the detector comprises a detector aperture.

22. The method of claim 21, wherein automatically focusing the light comprises controlling the position of the optical director to image the light source aperture directly on the detector aperture, wherein the strength of the signal is maximized.

23. The method of claim 18, comprising coupling a first port of a fiber coupler to the light source, coupling a second port of the fiber coupler to the detector, and coupling a third port of the fiber coupler to the optical director in the optical path.

24. The method of claim 23, comprising focusing light of the light source on the optical director using a focusing device in the optical path between the third port and the optical director.

25. The method of claim 24, comprising positioning the focusing device adjacent to the platform.

26. The method of claim 25, comprising positioning the focusing device in a same plane as the platform.

27. The method of claim 24, wherein the focusing device comprises a lens.

28. The method of claim 24, wherein the focusing device comprises a focusing mirror.

29. The method of claim 23, comprising coupling the optical path to the third port of the fiber coupler using a first mirror of the optical director.

30. The method of claim 29, comprising coupling the optical path to the sample using a second mirror of the optical director.

31. The method of claim 18, comprising positioning the beamsplitter to direct a light signal from the light source to the sample.

32. The method of claim 31, comprising positioning the beamsplitter to direct reflected light of the light signal from the sample to the detector.

33. The method of claim 18, comprising using the focusing system to control a length of the optical path by controlling movement of the beamsplitter relative to the platform.

34. The method of claim 18, comprising positioning a first lens between the light source and the beamsplitter, wherein the first lens is a collimating lens.

35. The method of claim 34, comprising positioning a second lens between the beamsplitter and the detector, wherein the second lens is a focusing lens.

36. The method of claim 18, wherein the detector comprises a spectrometer.

* * * * *